(12) United States Patent
Cho

(10) Patent No.: US 11,110,781 B2
(45) Date of Patent: Sep. 7, 2021

(54) OPENING STRUCTURE OF TAIL GATE AND ROOF AND MOUNTING METHOD THEREOF

(71) Applicants: HYUNDAI MOTOR COMPANY, Seoul (KR); KIA MOTORS CORPORATION, Seoul (KR)

(72) Inventor: Ki-Hyun Cho, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 8 days.

(21) Appl. No.: 16/700,364

(22) Filed: Dec. 2, 2019

(65) Prior Publication Data

US 2020/0223296 A1 Jul. 16, 2020

(30) Foreign Application Priority Data

Jan. 11, 2019 (KR) .................. 10-2019-0003895
Nov. 26, 2019 (KR) .................. 10-2019-0153251

(51) Int. Cl.
*B60J 5/10* (2006.01)
*B62D 33/027* (2006.01)
*B60J 7/16* (2006.01)

(52) U.S. Cl.
CPC ............ *B60J 7/1657* (2013.01); *B60J 5/101* (2013.01); *B60J 5/107* (2013.01); *B62D 33/027* (2013.01)

(58) Field of Classification Search
CPC ..... B60J 5/10; B60J 5/101; B60J 5/108; B60J 5/125; B60J 7/08; B60J 7/16; B60J 7/1607; B60J 7/1614; B60J 7/1657; B62D 33/027; B62D 33/0273
USPC ............ 296/56, 106, 146.8, 76, 207, 216.02
See application file for complete search history.

(56) References Cited

U.S. PATENT DOCUMENTS

| 4,184,709 A * | 1/1980 | Kim | B60J 1/1823 296/146.13 |
| 5,584,528 A * | 12/1996 | Cozzani | E05F 5/022 16/82 |
| 6,425,205 B2 * | 7/2002 | Wygle | E05F 15/619 296/56 |
| 6,688,682 B2 * | 2/2004 | Arthur | B60J 7/1642 296/216.02 |
| 2011/0290050 A1 * | 12/2011 | Kummer | E05F 15/622 74/89.37 |
| 2012/0242104 A1 * | 9/2012 | Babbage | B60J 7/1642 296/26.06 |

FOREIGN PATENT DOCUMENTS

KR 1998-28630 A 7/1998

* cited by examiner

*Primary Examiner* — Dennis H Pedder
(74) *Attorney, Agent, or Firm* — McDonnell Boehnen Hulbert & Berghoff LLP

(57) ABSTRACT

An opening structure of a tail gate and a roof may include a cross member mounted at the roof of a vehicle, a hinge mounted at the cross member and a tail gate body in white (BIW), a hinge drive motor operating the hinge, and a spindle drive expandably and contractibly mounted to move the roof. The tail gate is opened by the hinge drive motor, or a rear of the roof is moved upward by the expansion of the spindle drive after the tail gate is opened.

7 Claims, 8 Drawing Sheets

FIG.7
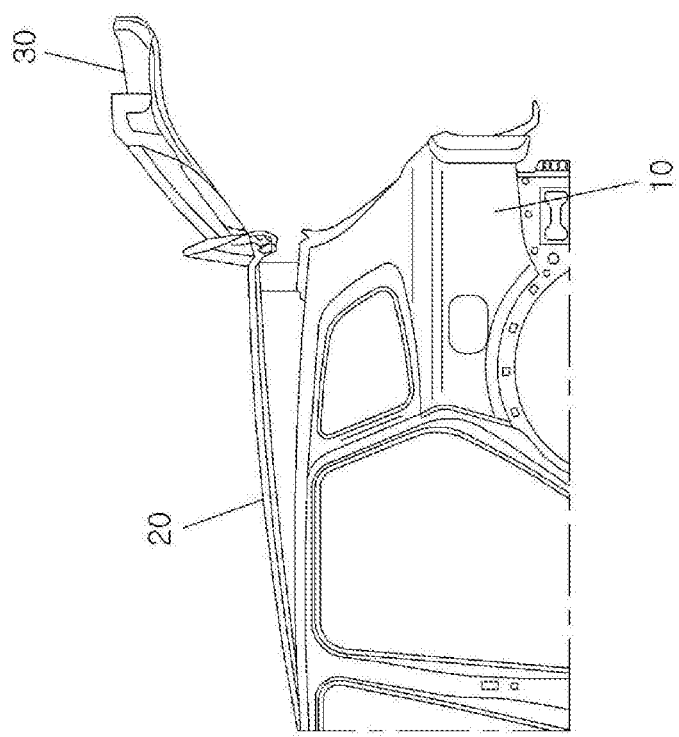
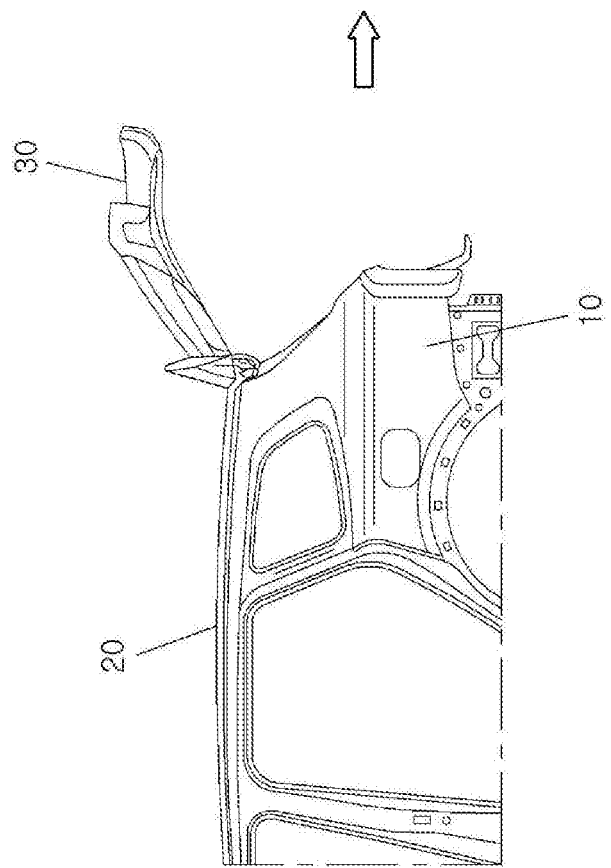

OPENING STRUCTURE OF TAIL GATE AND ROOF AND MOUNTING METHOD THEREOF

CROSS-REFERENCE TO RELATED APPLICATIONS

This application claims priority to Korean Patent Application No. 10-2019-0003895 filed on Jan. 11, 2019, and Korean Patent Application No. 10-2019-0153251 filed on Nov. 26, 2019, which are incorporated herein by reference in their entirety.

BACKGROUND OF THE DISCLOSURE

Field of the Disclosure

The present disclosure relates to an opening structure of a tail gate and a roof and a mounting method thereof, and more particularly, the present disclosure relates to an opening structure of a tail gate and a roof and a mounting method thereof capable of maximizing an opening space of the tail gate of a vehicle.

Description of the Related Art

A vehicle such as a hatchback type passenger vehicle, a recreational vehicle, or a van is equipped with a tail gate at the rear side of the vehicle for loading or unloading the cargo inside the vehicle. The tail gate is hinged at the rear side of a vehicle body so as to be rotatable and opened and closed.

The tail gate performs the rotation for opening and closing through a hinge coupling, and in order not to be interfered with the rotation for opening and closing of the tail gate, a roof of the vehicle requires an undercut portion that is not vertical but curved.

On the other hand, in forming the vehicle body of the vehicle, when forming a basic structure of the vehicle body in the vehicle body assembly line after a roof panel and a side panel are separately formed, a side surface of the roof panel and the side panel are coupled with each other via welding.

The roof is generally made of steel material, the roof panel constituting the roof of the vehicle and a hinge may be coupled thereto, and a rear roof rail with an undercut is integrated with it.

However, conventionally, the opening structure of the tail gate has a limitation in securing a sufficient space, it is not possible to get in and out of the vehicle while standing, and the roof-integrated tail gate does not have a structure that connects between side structures during the manufacturing, and thus does not secure rigidity, so it is difficult to produce the roof-integrated tail gate.

The foregoing is intended merely to aid in the understanding of the background of the present disclosure, and is not intended to mean that the present disclosure falls within the purview of the related art that is already known to those skilled in the art.

SUMMARY OF THE DISCLOSURE

The present disclosure has been made in an effort to provide an opening structure of a tail gate and a roof and a mounting method thereof securing space and a vehicle body stiffness in order to get in and out of a vehicle by standing through the tail gate.

In accordance with one aspect of the present disclosure, an opening structure of a tail gate and a roof may include a cross member mounted at the roof of a vehicle; a hinge mounted at the cross member and a tail gate body in white (BIW), a hinge drive motor operating the hinge, and a spindle drive expandably and contractibly mounted to move the roof; and wherein the tail gate may be opened by the hinge drive motor, or a rear of the roof may be moved upward by the expansion of the spindle drive after the tail gate is opened.

The cross member may be mounted at the lower rear side of the roof in the horizontal direction.

The hinge may be mounted at both end portions of the cross member.

The lower end of the spindle drive may be mounted at a quarter panel of a vehicle body.

An upper end of the spindle drive may be connected with the cross member via a ball joint.

A guide bumper may be mounted at the contact portion of the cross member and vehicle body, respectively.

The guide bumper may include a cross member guide bumper mounted at the cross member and a vehicle body guide bumper mounted at the vehicle body.

A sealing member may be interposed between a roof support panel which is fastened to the cross member to support the roof and a portion where an outside panel extension panel and a quarter panel are joined.

In accordance with another aspect of the present disclosure, a mounting method of an opening structure of a tail gate and a roof in a vehicle includes: a) mounting a hinge and a tail gate body in white (BIW) at a cross member mounted at a roof panel; b) fastening the cross member and a quarter panel by an erection bolt; c) removing the erection bolt and fastening the cross member and a ball joint; and d) fastening the spindle drive and the quarter panel via a ball joint.

In the removing of the erection bolt and the fastening of the cross member and the ball joint, a vehicle body guide bumper may be mounted at a cross member guide bumper mounted at the cross member and the quarter panel, respectively.

The mounting method of the opening structure of the tail gate and the roof may include performing painting prior to removing the erection bolt.

For a vehicle in which glass is employed instead of the roof panel, in the step a), the hinge and the tail gate body in white (BIW) may be mounted at the cross member on which the glass is to be mounted.

The glass may be assembled in the step c) or d).

In accordance with the exemplary embodiment of the present disclosure, the opening structure of the tail gate and the roof and the mounting method thereof can secure a sufficient space in order to get in and out of the vehicle with standing through the tail gate and provide the effect of improving the safety by maintaining the rigidity of the vehicle in accordance with the space securing.

BRIEF DESCRIPTION OF THE DRAWINGS

The above and other objects, features and advantages of the present disclosure will be more clearly understood from the following detailed description taken in conjunction with the accompanying drawings, in which:

FIG. 7 is a schematic view showing an operating sequence of the opening structure of the tail gate and the roof according to the exemplary embodiment of the present disclosure.

DETAILED DESCRIPTION

The exemplary embodiments described below are provided so that those skilled in the art can easily understand the technical idea of the present disclosure, and thus the present disclosure is not limited thereto. In addition, the items represented in the attached drawings are the schematized drawings in order for easily describing the exemplary embodiments of the present disclosure and may be different from the forms actually implemented.

When any constituent element is referred to as being connected or contacted with other constituent elements, it should be understood that it may be directly connected or contacted with the other constituent elements but there may be the other constituent elements therebetween.

Figure 1:
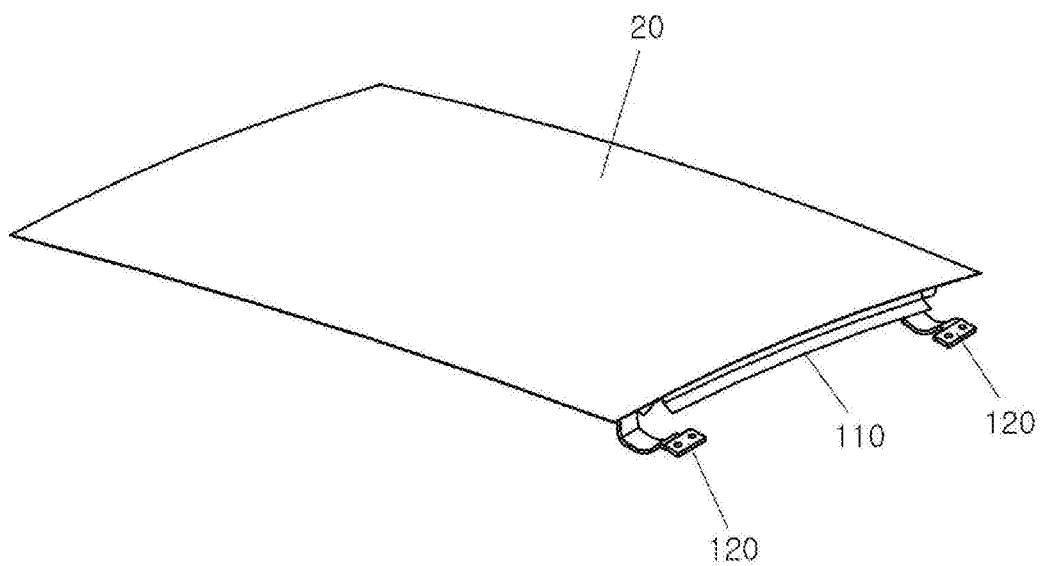
FIG. 1 is a schematic view of the structure of a tail gate operating part in an opening structure of a tail gate and a roof according to an exemplary embodiment of the present disclosure.
Figure 2:
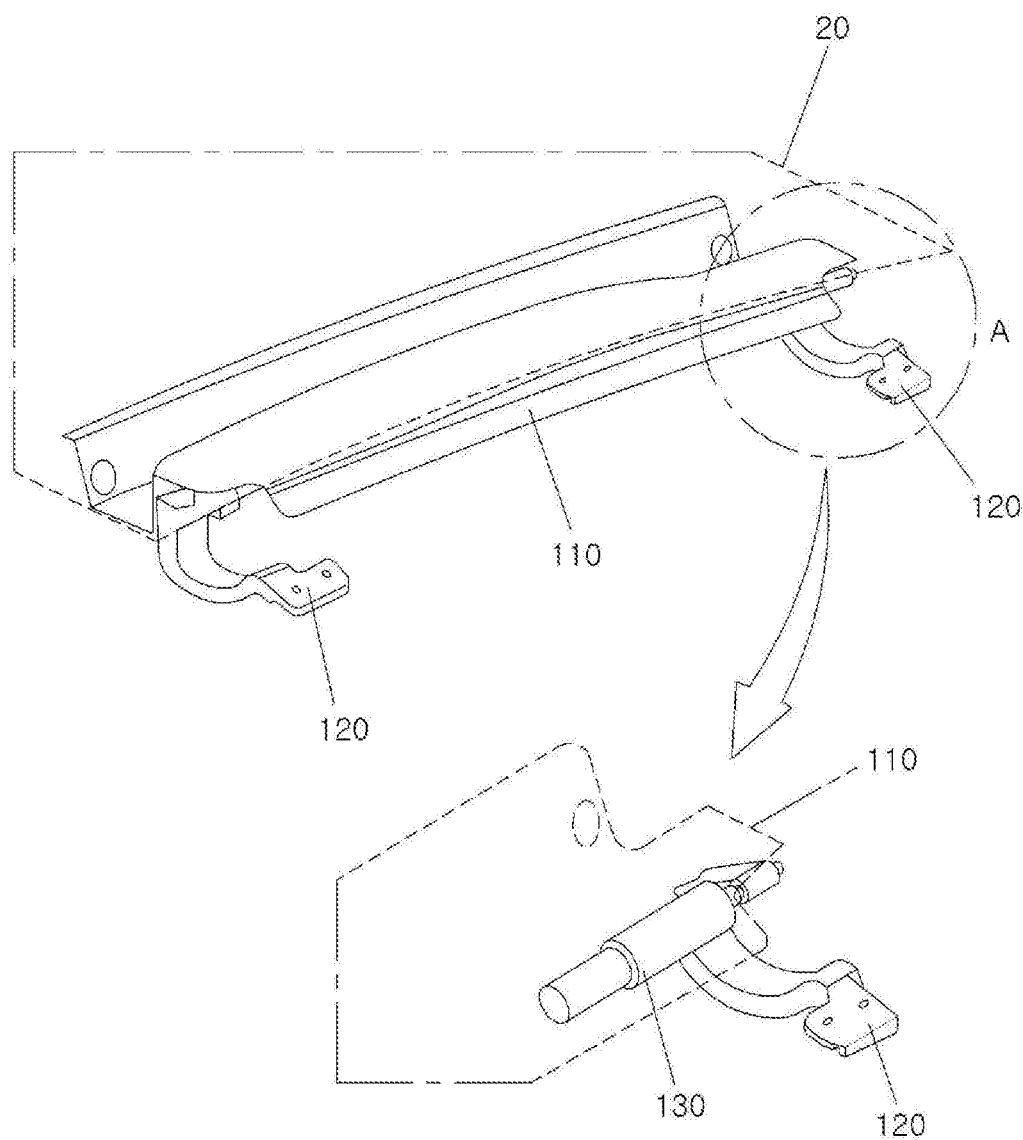
FIG. 2 is a schematic view of a cross member at which a hinge and a driving motor are mounted in the opening structure of the tail gate and the roof according to the exemplary embodiment of the present disclosure of FIG. 1.

FIG. 1 is schematic view of the structure of a tail gate operating part in an opening structure of a tail gate and a roof according to an exemplary embodiment of the present disclosure; FIG. 2 is a schematic view of a cross member at which a hinge and a driving motor are mounted in the opening structure of the tail gate and the roof according to the exemplary embodiment of the present disclosure of FIG. 1; and FIG. 7 is a schematic view showing an operating sequence of the opening structure of the tail gate and the roof according to the exemplary embodiment of the present disclosure.

Referring to FIGS. 1 and 2 together with FIG. 7, an opening structure of a tail gate and a roof according to an exemplary embodiment of the present may include a cross member 110 mounted at a roof 20 of a vehicle, a hinge 120 mounted at the cross member 110 and a tail gate 30 body in white (BIW), a hinge drive motor 130 operating the hinge 120, and a spindle drive 140 moving the roof 20. By this configuration, only the tail gate 30 is opened and closed alone by the hinge drive motor 130, or after the tail gate 30 is primarily opened by the hinge drive motor 130 (see left side in FIG. 7), the spindle drive 140 may move the roof 20 up to secondarily open the roof 20 (see right side in FIG. 7). That is, only the tail gate 30 may be opened, or the roof 20 may also be opened after the tail gate 30 is opened.

In the exemplary embodiment, the cross member 110 may be mounted at the lower rear side of the roof 20 in the horizontal direction, that is, in the width direction of the vehicle.

Herein, the hinge 120 may have a gooseneck shape with a curved end and a hinge drive motor 130 may be preferably mounted on the gooseneck as shown in the enlarged view of portion A. The hinge drive motor 120 may be preferably mounted at both end portions of the cross member 110.

A roof support panel 115 fastened to the cross member 110 to support the roof 20 is mounted at a circumference of the roof 20.

Figure 3:
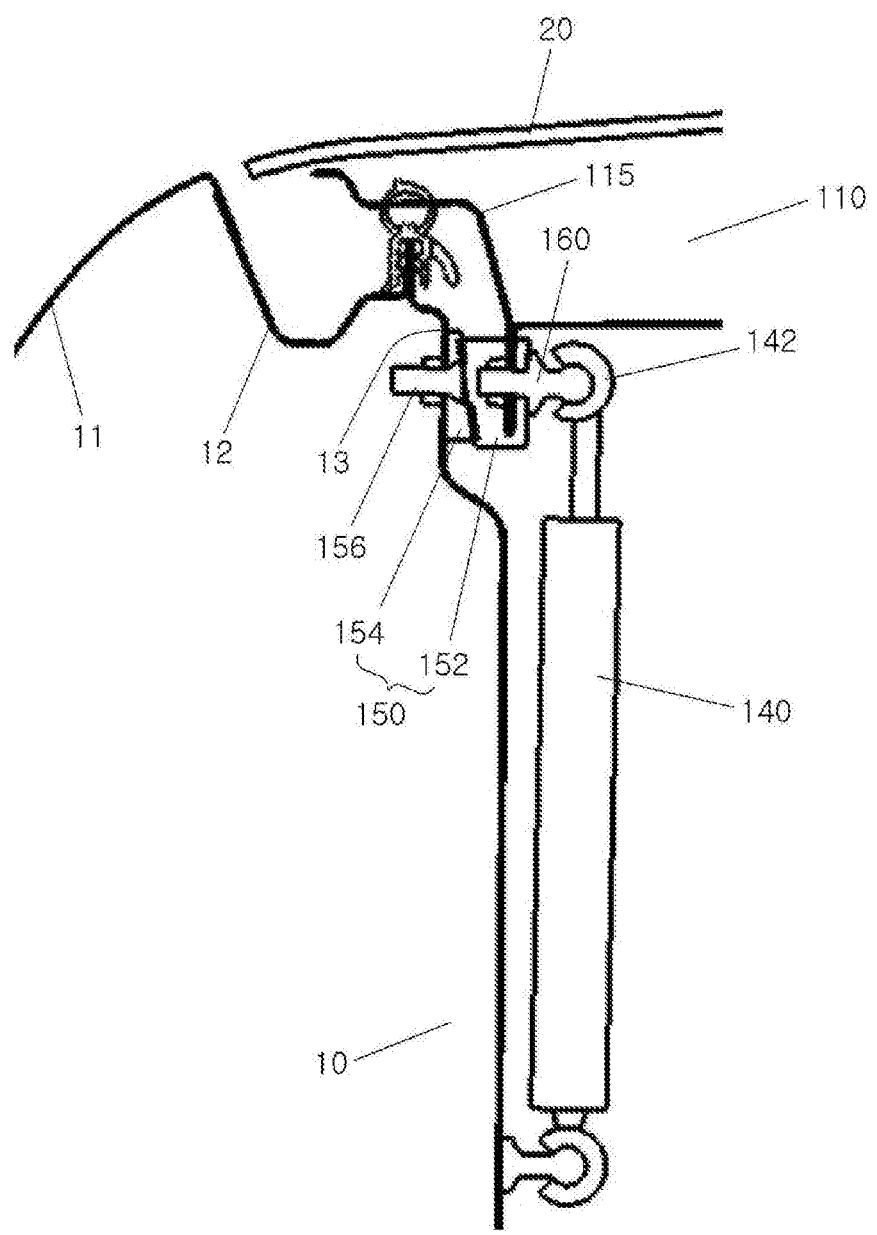
FIG. 3 is a schematic view showing a fastening structure using a ball joint in the opening structure of the tail gate and the roof according to the exemplary embodiment of the present disclosure.
Figure 4:
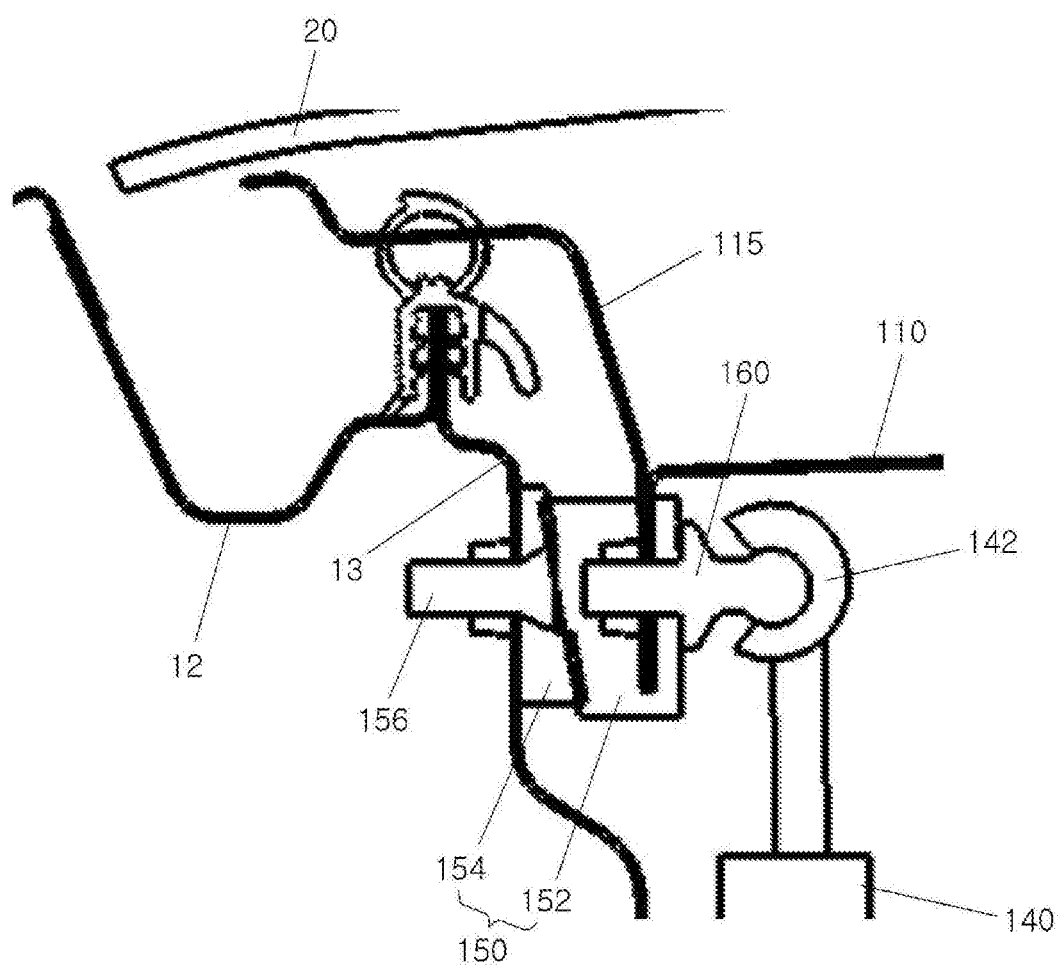
FIG. 4 is an enlarged schematic view of the opening structure of the tail gate and the roof according to the exemplary embodiment of the present disclosure of FIG. 3.

FIG. 3 is a schematic view showing a fastening structure using a ball joint in the opening structure of the tail gate and the roof according to the exemplary embodiment of the present disclosure; and FIG. 4 is an enlarged schematic view of the opening structure of the tail gate and the roof according to the exemplary embodiment of the present disclosure of FIG. 3.

Referring to FIGS. 3 and 4, the mounting structure of the spindle drive 140 is described in detail.

In accordance with the present disclosure, the spindle drive 140 may be mounted at an inner side surface of a vehicle body 10 and the operating end portion 142 of the spindle drive 140, that is, the upper end of the spindle drive 140 may be connected with the cross member 110 via a ball joint 160.

Herein, the vehicle body 10 is configured to include an outside panel 11, an outside panel extension panel 12 connected with the outside panel 11 and a quarter panel 13 connected with the outside panel extension panel 12, and one end portion of the spindle drive 140 may be mounted at the inner side surface of vehicle body 10, that is, the lower portion of a vertical side surface of the quarter panel 13. The operating end portion 142, which is reciprocated in the vertical directions, may be position at the upper end portion of the spindle drive 140 and connected with the cross member 110 via the ball joint 160, and the cross member 110 may be provided at the roof 20. A hydraulic pressure actuator may be preferably provided within the spindle drive 140 to allow the operating end portion 142 to move up and down. The front end of the roof 20 is hinged to the vehicle body, so that the roof 20 is rotated around a front hinge shaft (not shown) so that when the spindle drive 140 is extended, the rear of the roof 20 moves up and down.

Further, a guide bumper 150 may be mounted at the contact portion of the cross member 110 and the vehicle body 10, and the guide bumper 150 is configured to include a cross member guide bumper 152 mounted at the cross member 110 and a vehicle body guide bumper 154 mounted at the vehicle body 10. The contact portion of the cross member guide bumper 152 and the vehicle body guide bumper 154 may be preferably slanted based on the vertical direction. The cross member guide bumper 152 is mounted at the cross member 110 via a ball joint 160. The vehicle body guide bumper 154 is mounted at the vehicle body 10, that is, the quarter panel 13 via a fastening bolt 156.

Figure 5:
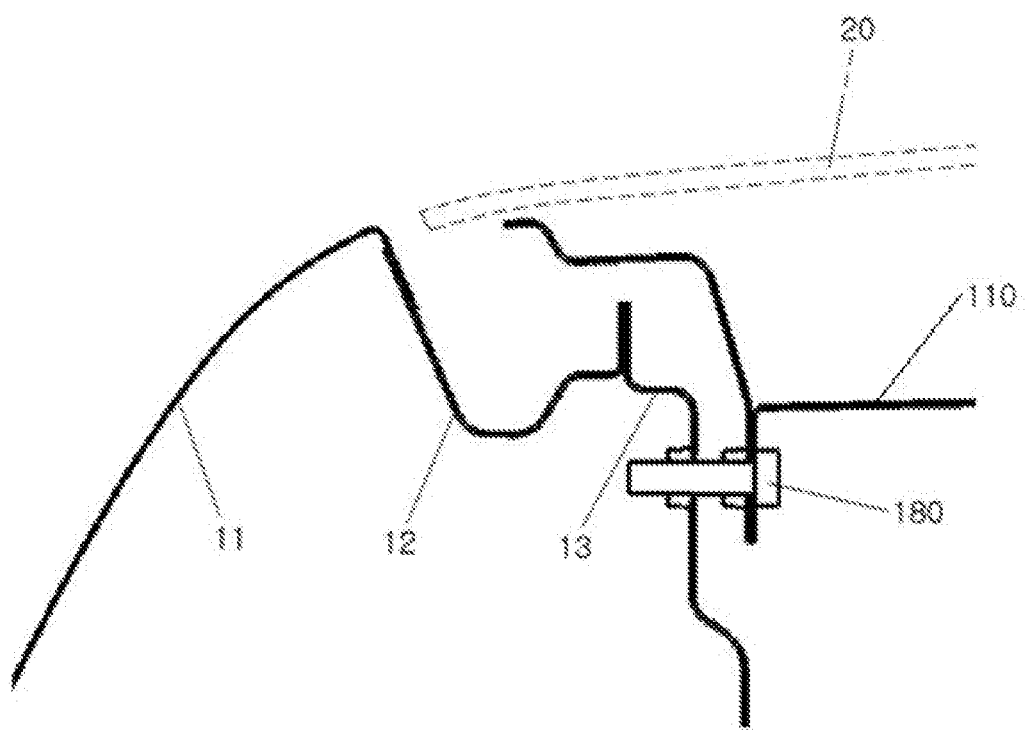
FIG. 5 is a schematic view showing a fastening structure using an erection bolt in the opening structure of the tail gate and the roof according to the exemplary embodiment of the present disclosure.
Figure 6:
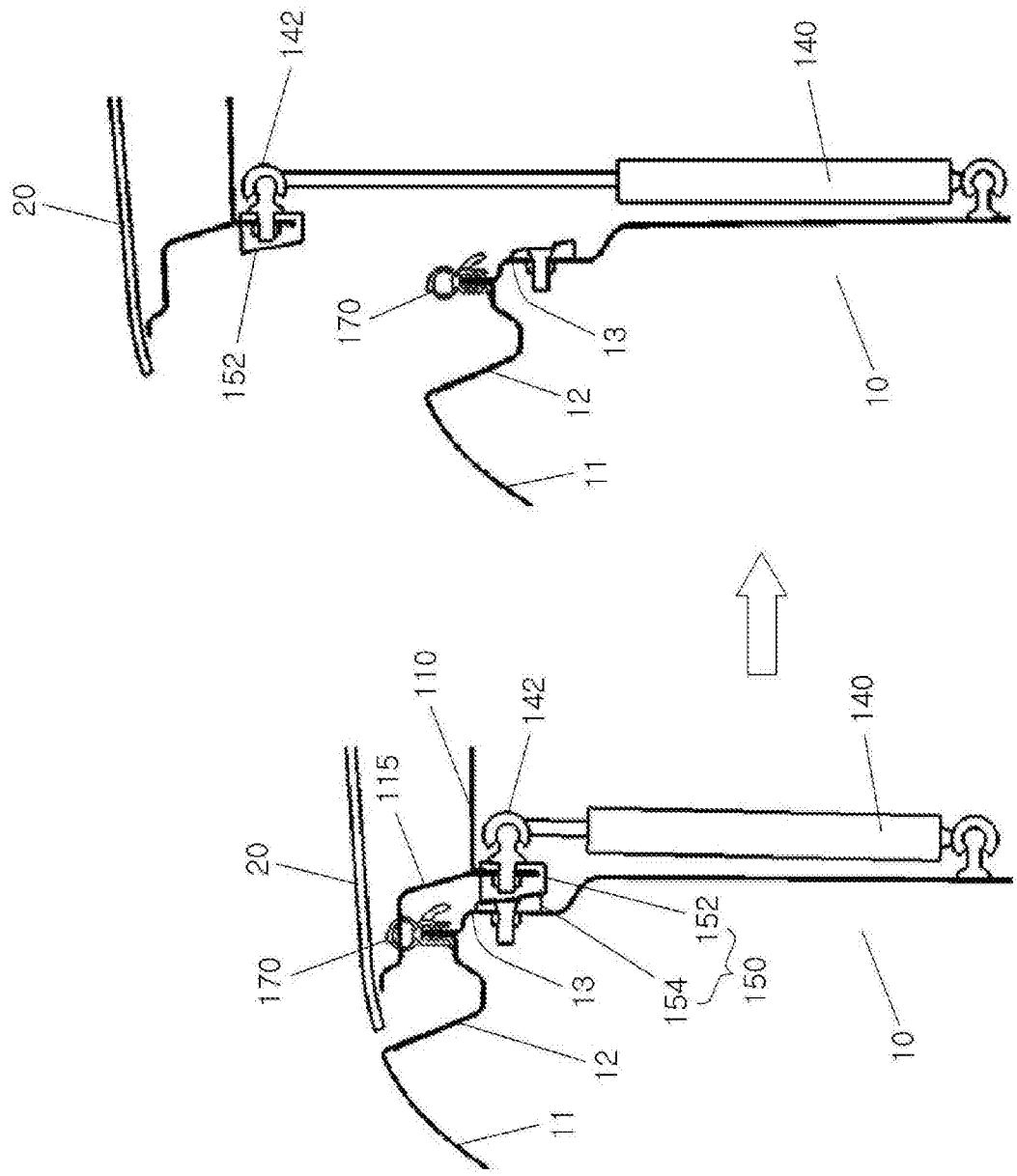
FIG. 6 is a schematic view showing a roof opening structure using the boll joint in the opening structure of the tail gate and the roof according to the exemplary embodiment of the present disclosure.
Figure 8:
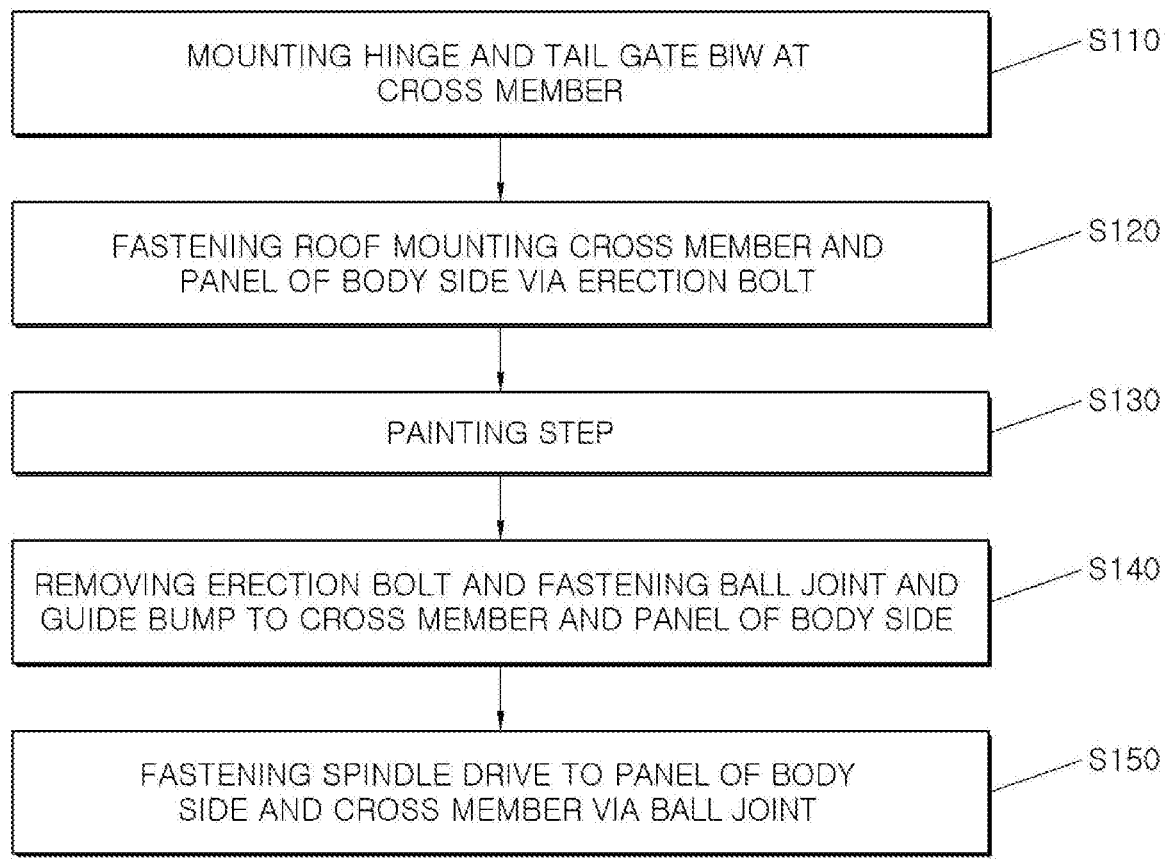
FIG. 8 is a flow chart showing a mounting method in the opening structure of the tail gate and the roof according to the exemplary embodiment of the present disclosure.

FIG. 5 is a schematic view showing a fastening structure using an erection bolt in the opening structure of the tail gate and the roof according to the exemplary embodiment of the present disclosure; FIG. 6 is a schematic view showing a roof opening structure using the boll joint in the opening structure of the tail gate and the roof according to the exemplary embodiment of the present disclosure; FIG. 7 is a schematic view showing an operating sequence of the opening structure of the tail gate and the roof according to the exemplary embodiment of the present disclosure; and FIG. 8 is a flow chart showing a mounting method in the opening structure of the tail gate and the roof according to the exemplary embodiment of the present disclosure.

The operating relationship and mounting method thereof the opening structure of the tail gate and the roof according to the exemplary embodiment of the present disclosure by referring to FIG. 5 to FIG. 8 together with FIG. 1 to FIG. 4 will be described below.

The hinge 120 and the tail gate 30 body in white (BIW) are mounted at the cross member 110 mounted on the roof panel (S110). Here, the tail gate BIW means a tail gate structure in the state where the interior/exterior assembly (for example, trim, lamp assembly, wiring, etc.) is not attached at all before the painting is performed during the manufacturing the tail gate 30 of the vehicle.

Thereafter, the cross member 110 and the vehicle body 10 are fastened to an erection bolt 180 (S120). The erection bolt 180 penetrates through the cross member 110 and is fastened to the quarter panel 13, and thus the cross member 110 is fastened to the quarter panel 13.

If the vehicle body is not painted, the painting step is performed (S130).

Subsequently, the erection bolt 180 is removed and the ball joint 160 for fastening the cross member guide bumper 152 and the cross member 110 is fastened (S140).

Next, the spindle drive 140 is fastened to the vehicle body 10 via the ball joint 160 (S150).

Thereafter, the hinge driving motors 130 may be mounted at both ends of the cross member 110, or a tail gate trim or the like may be mounted at the tail gate BIW. The hinge driving motor 130 and the tail gate trim may be mounted in any order.

After mounted as like this, the hinge drive motor 130 is operated to rotate the hinge 120 so that the tail gate 30 is primarily opened (see left side in FIG. 7), and after the tail gate 30 is rotated in the upper direction, the spindle drive 140 is operated so that the operating end portion 142 is moved in the upper direction, whereby the rear side of the roof 20 connected with the operating end portion 142 is secondarily moved in the upper direction because the front side of the roof is connected via the hinge (see right side in FIG. 7).

Herein, a sealing member 170 may be interposed between the cross member 110 and the vehicle body 10, and the sealing member 170 may be preferably mounted at the portion corresponding to the case that the cross member 110 is closed from the upper portion to the lower portion so that it performs watertight and impact prevention. The sealing member 170 is mounted at a portion where the outside panel extension panel 12 and the quarter panel 13 are joined to each other, and an end thereof is sealed in contact with the roof support panel 115.

The close operation of the tail gate 30 and the roof 20 may be preferably performed in the reverse order of the previously described order and may be performed simultaneously.

On the other hand, when the glass is applied instead of the panel in the roof 20, the glass is not included in the temporary fastening, and preferably assembled after the painting step.

That is, when the glass is applied to the vehicle instead of the panel, in step S110, the hinge 120 and the tail gate 30 body in white (BIW) are mounted at the cross member 110 on which the glass is to be mounted.

In addition, in step S140 or S150, the glass is mounted.

Therefore, the opening structure of the tail gate and the roof and mounting method thereof according to the present disclosure is the structure opening the tail gate and the roof and opens the tail gate and the roof while maintaining the vehicle body stiffness, thereby securing a sufficient space and improving safety.

Those of ordinary skill in the art to which the present disclosure belongs may understand that the present disclosure may be made in other specific forms without changing technical ideas or essential features thereof. Therefore, it should be understood that the above-described exemplary embodiments are merely presented by selecting the most preferred embodiments among various possible exemplary embodiments in order to help those skilled in the art understand, the technical ideas of the present disclosure are not limited or restricted only by the presented embodiments, and various changes, additions and modifications may be made without departing from the technical idea of the present disclosure and other equivalent exemplary embodiments are possible.

The invention claimed is:

1. An opening structure of a tail gate and a roof, comprising:
   a cross member mounted at the roof of a vehicle;
   a hinge mounted at the cross member and a tail gate body in white (BIW);
   a hinge drive motor operating the hinge; and
   a spindle drive expandably and contractibly mounted to move the roof;
   wherein the tail gate is opened by the hinge drive motor, or a rear of the roof is moved upward by the expansion of the spindle drive after the tail gate is opened;
   wherein a sealing member is interposed between a roof support panel which is fastened to the cross member to support the roof and a portion where an outside panel extension panel and a quarter panel are joined;
   wherein a cross section of the panel extension panel is formed in a U shape so a middle part of the cross section of the panel extension panel is low; and
   wherein the sealing member is located higher than the middle part of the cross section of the panel extension panel.

2. The opening structure of the tail gate and the roof of claim 1, wherein the cross member is mounted at the lower rear side of the roof in the horizontal direction.

3. The opening structure of the tail gate and the roof of claim 1, wherein the hinge is mounted at both end portions of the cross member.

4. The opening structure of the tail gate and the roof of claim 1, wherein a lower end of the spindle drive is mounted at a quarter panel of a vehicle body.

5. The opening structure of the tail gate and the roof of claim 4, wherein an upper end of the spindle drive is connected with the cross member via a ball joint.

6. The opening structure of the tail gate and the roof of claim 1, wherein a guide bumper is mounted at a contact portion of the cross member and a vehicle body, respectively.

7. The opening structure of the tail gate and the roof of claim 6, wherein the guide bumper comprises a cross member guide bumper mounted at the cross member and a vehicle body guide bumper mounted at the vehicle body.

\* \* \* \* \*